United States Patent
Rawlins

(10) Patent No.: US 8,761,370 B2
(45) Date of Patent: Jun. 24, 2014

(54) METHOD AND APPARATUS FOR COMMUNICATION HAVING CRITICALLY ASSURED SERVICES

(75) Inventor: Darrell Rawlins, Kaneohe, HI (US)

(73) Assignee: AT&T Government Solutions, Inc., Vienna, VA (US)

( * ) Notice: Subject to any disclaimer, the term of this patent is extended or adjusted under 35 U.S.C. 154(b) by 1303 days.

(21) Appl. No.: 12/341,532

(22) Filed: Dec. 22, 2008

(65) Prior Publication Data

US 2010/0034370 A1 Feb. 11, 2010

Related U.S. Application Data

(60) Provisional application No. 61/188,245, filed on Aug. 7, 2008.

(51) Int. Cl.
*H04M 7/00* (2006.01)

(52) U.S. Cl.
USPC ............................... 379/221.04; 379/221.01

(58) Field of Classification Search
USPC .................. 379/221.03, 219, 207, 211.02
See application file for complete search history.

(56) References Cited

U.S. PATENT DOCUMENTS

| 4,160,129 | A | | 7/1979 | Peyser et al. |
| 5,063,592 | A | * | 11/1991 | Cannella et al. ......... 379/220.01 |
| 5,452,347 | A | | 9/1995 | Iglehart et al. |
| 5,479,608 | A | * | 12/1995 | Richardson .................... 714/4.2 |
| 5,793,843 | A | | 8/1998 | Morris |
| 6,359,858 | B1 | | 3/2002 | Smith et al. |
| 7,170,854 | B1 | * | 1/2007 | Orrell et al. ................... 370/228 |
| 7,924,997 | B1 | * | 4/2011 | Cope ......................... 379/211.02 |

* cited by examiner

*Primary Examiner* — Amal Zenati

(74) *Attorney, Agent, or Firm* — Wolff & Samson PC

(57) ABSTRACT

A critical assured service that includes a network management system and an A/B switch. The A/B switch having at least four ports with a first port being connected to the network management system over a dedicated line. The A/B switch sending and receiving messages and/or signals from the network management system over the first dedicated line. The A/B switch automatically switching telephone service from a first point of presence to a second point of presence after the A/B is signaled that the first point of service is inoperable.

21 Claims, 4 Drawing Sheets

METHOD AND APPARATUS FOR COMMUNICATION HAVING CRITICALLY ASSURED SERVICES

CROSS REFERENCE TO RELATED APPLICATIONS

The present application claims the benefit of U.S. Provisional Application No. 61/188,245 filed Aug. 7, 2008 entitled "METHOD AND APPARATUS FOR CRITICAL ASSURED SERVICES."

FIELD

The disclosed technology relates generally to communication services, and more specifically, to telephony having critically assured services.

BACKGROUND

In some communication environments, communication service must always be available to a customer. For example, during times of war, the military must always have access to telephony service so that military orders and objectives may be sent and received. Once the lines of communication fail, it is very difficult for commanding officers to implement strategies without having all the information available to them.

Therefore, there is a need for a communication service that provides certain users within a network with uninterrupted service. For these critical subscribers, dual-switch connectivity needs to be provided to guarantee that these subscribers will be able to initiate and receive communications even when the subtending central office or access line is unable to process calls. These techniques should ensure that the subscriber's normal features and functions are not degraded or lost. (In this disclosure, "communications" refers to the sending or receiving of any type of media or information, such as, for example, audio, video, data, or fax. Accordingly, aspects of the disclosed technology may relate to ordinary telephony as well as to more sophisticated communications services. All of these types of services are meant to be included in the term "communications". However, for simplicity, this disclosure, in large part, is written in terms of ordinary telephony.)

Additionally, there is a need for the network to automatically sense and reroute incoming/outgoing communications during outages at the subtending central office, link or access line, and to continue to provide class of service and features authorized to the subscriber's assigned telephone number. There is also a need for the network to automatically reset to a default configuration when the subtending central office, link or access line has been restored.

SUMMARY

The disclosed technology is directed towards a network for critical assured services. The network ensures that no single point of failure within a network will deny service at a user's location. To implement such a system, the disclosed technology provides customer premises equipment with diverse redundant connections to the network. The customer premises equipment may include a network management system, routers, DSLAMs, class 5 switches, channel banks, Network Operation Centers (NOCs) and an IP based A/B switch.

The A/B switch may include four ports. The first port is connected to the network management system over a dedicated Ethernet connection. The Ethernet connection is capable of sending and receiving messages and/or signals from and to the network management system. Based on the messages received, the A/B switch automatically switches the user's telephone service from the first point of presence to the second point of presence. For example, if the A/B switch is signaled that the first point of presence lost service or that the connection to the first point of presence is broken, the A/B switch will switch from the first point of presence to the second point of presence and then notify the network management system that the first point of presence lost service. The A/B switch and/or the network management system is capable of switching service back to an original configuration when service is restored at the first point of presence and the secondary point of presence is in an idle state. This capability ensures that in the event a call is in progress on the secondary point of presence, the call is not dropped when the disclosed technology switches back to an original configuration.

Messages and/or signals that are transmitted over the dedicated Ethernet line may include an auto-ping signal for determining if the first point of presence is operational. That is, the auto-ping signal may continuously monitor the first point of presence and switch the A/B device based on the response from the first point of presence. Other monitoring signals may include a class 5 switch call processing overload alarm and/or a signal transfer point disturbance alarm through the network management system and upon detection, the disclosed technology will send an appropriate command to the A/B device to switch from the first to second point of presence. The A/B device will remain latched in that position until the network management system sends a command to switch back to the first point of presence.

The first point of presence is transported over an Ethernet connection using copper media and DSL with plain old telephone service (POTS) to the primary 5ESS switch. The POTS service is dropped from the DSL at a splitter panel and connected to a primary 5ESS switch. The second point of presence of the A/B switch service is transported over a standard foreign exchange service connection using a diverse path to a secondary 5ESS switch. The second point of presence is connected between the third port of the A/B switch and the network management system over a modified service connection. The modified telephone service connection may include a wide area network connection having a foreign exchange service line card. The first point of presence provides a first dial tone to the A/B switch and the second point of presence provides a second dial tone to the A/B switch. The first point of presence and the second point of presence share a directory number that is interchangeable between the two when requested by the network.

The dual dial tone allows a CAS user to place outgoing calls immediately upon the IP AB switch changing from the one point of presence to the other. To switch directory numbers between the points of presence the network management system receives an appropriate handshake signal from the AB device and sends a routing table update command to a tele-management system. This allows incoming calls into network to be routed to appropriate 5ESS switch associated with the point of presence position on the AB device. The network management system may also send a pre-scripted batch release update command to the tele-management system to change a specified group of phone numbers within any given 5ESS switch failure scenario from the first point of presence to the second point of presence thereby allowing outgoing/incoming calls internal or external of the network to be directed along the second point of presence's secondary transmission path. The tele-management system may be a communication management Information tool ("COMIT")

server that processes all 5ESS translations via dedicated transmission control protocols (TCP) ports.

The fourth port of the A/B switch may be connected to a modem or other device. This modem or other device may receive telephone service from the A/B switch and may send this service to a standard desktop telephone regardless of which point of presence is sending the service.

In alternative embodiments, the NMS itself may be connected to the A/B switch by way of a CAS-type topology to provide even greater assurance of continued service.

These and other advantages of the disclosed technology will be apparent to those of ordinary skill in the art by reference to the following detailed description and the accompanying drawings.

DETAILED DESCRIPTION

The disclosed technology is directed towards an apparatus for critical assured services (hereinafter, "CAS") that provides dual-switch-connectivity telephony service to certain users service by a network management system (hereinafter "NMS").

Figure 1:
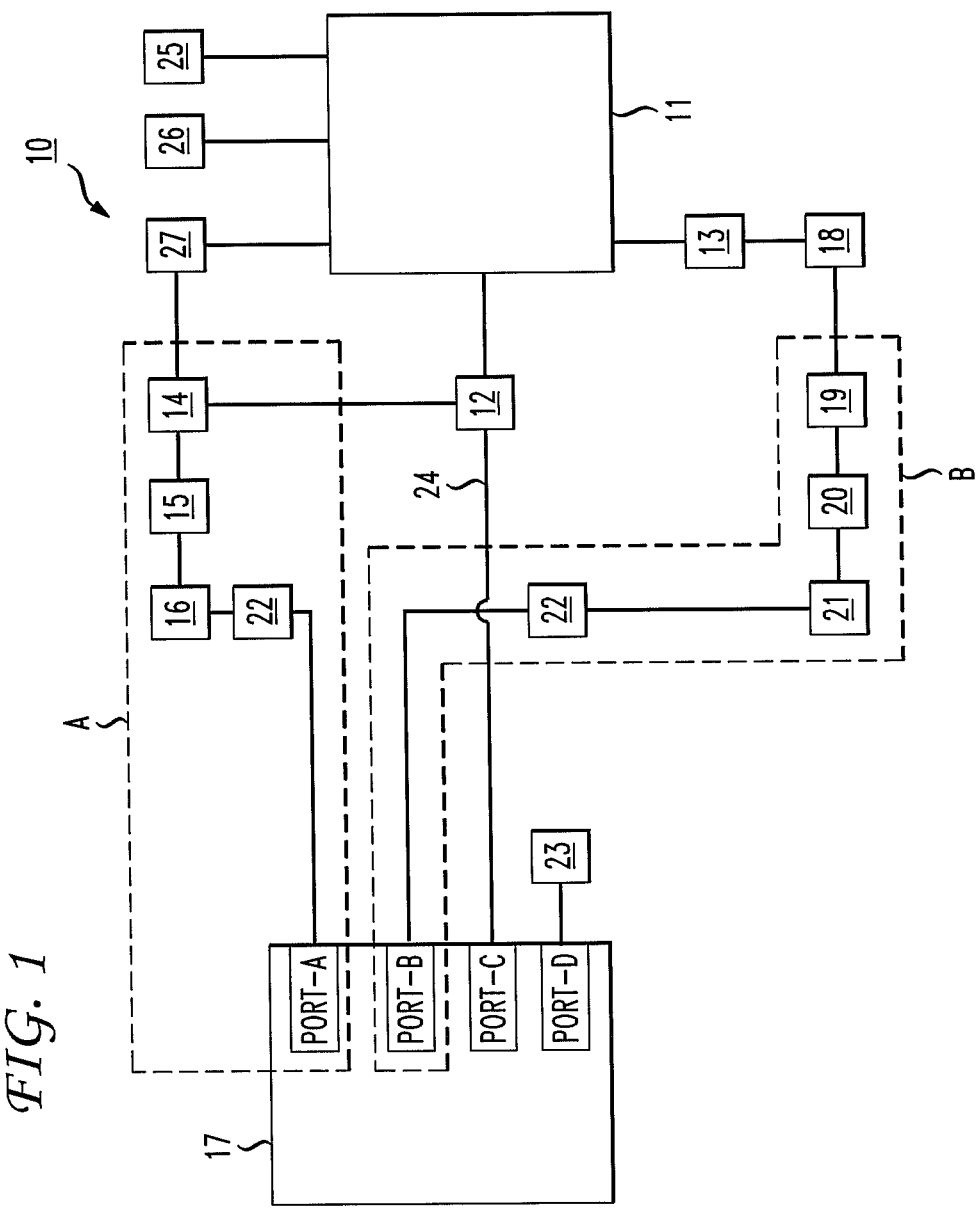
FIG. 1 is a block diagram showing a first embodiment of the present disclosed technology.

FIG. 1 shows a first design for the critical assured services 10. This embodiment of the disclosed technology includes a network management system 11, an A/B switch 17, a first point of presence 14, a second point of presence 19 and a tele-management system (TMS) 18.

The A/B switch 17 is a multi-port switch that provides the disclosed technology with at least two separate and distinct telephony connections. (The switch may be configured for any type of communications protocol, format or technology.) The multi-port switch 17 has at least two ports for receiving telephony service from at least two separate and distinct points of presence (Ports A and B), at least one port for transmitting the telephony to a receiving device (Port D) and at least one port for sending and receiving operational and/or monitoring signals (Port C).

The port for sending and receiving operational signals, Port C in this embodiment, is connected to the network management system 11 over a dedicated line 24 via an edge router 12. The dedicated line 24 is capable of sending and receiving messages and/or signals from and to the network management system 11. Based on the messages received, the A/B switch 17 automatically switches telephone service from the first point of presence 14 to the second point of presence 19 during a cable outage or some other scenario. The A/B switch 17 may also be capable of switching service back to an original configuration when the first point of service 14 becomes operational. That is, the CAS design 10 may automatically detect when telephony cable outage is repaired and reset the A/B switch 17 position back to the A position.

The A/B switch 17 may be an IP-A/B switch that is an automatic, remotely controlled A/B switch for a communications circuit. Remote control may be accomplished via a 10/100 Ethernet port supporting TCP/IP protocols, e.g., HTTP (web browser), SNMP, and TCP messaging. The TCP protocol is used for direct computer control of the switch while automatic control is provided by the auto-ping feature.

The auto-ping feature may continuously monitor one or more network devices for operability and the A/B switch 17 will switch between the network devices based on the devices response to a periodic ping request. The A/B switch 17 may also be capable of auto-pinging multiple network devices.

In the first embodiment, the A/B switch is configured for the A (primary) and B (secondary) paths, but multiple paths, greater than two, are also contemplated. The primary path A and the secondary path B for the A/B switch 17 may be provided using any one of the following Physical Diverse Routing (PDR) methods:

1. Copper cables in separate conduits.
2. Wireless free space optic devices.
3. Existing fiber optic cables.
4. Existing microwave transmission facilities.

The A/B switch 17, in this embodiment, changes from the "A" to "B" position when a first control signal corresponding to the auto-ping response for Port A fails within an expected response time. The CAS design may also automatically detect when a telephony cable outage is repaired and may reset the A/B switch position back to the A position.

In the event either "A" or "B" auto-ping failure occurs, an alarm, integrated into the NMS, is generated. When a failure occurs, the system may allow the NMS 11 to graphically display the CAS user's phone instrument 23 in the A or B position at a network operations center (NOC) 25 associated with the NMS 11.

Port A of the A/B switch is connected to the first, or a primary-serving, point of presence (hereinafter, "POP") or central office (hereinafter, "CO") 14. The primary POP 14 may be a 5ESS switch connected to a service delivery point (not shown) over an existing copper cable plant using DSL with POTS.

The primary POP 14 is connected to the network management system 11 via an edge router 12 and to Port A of the A/B switch 17 over a standard service connection. The path of the standard service connection starts at a 5ESS switch 14 and connects the 5ESS switch 14 to a DSL splitter panel 15 over a DSL POTS line. The DSL splitter panel 15 is then connected to a Digital Subscriber Line Access Multiplexer 16 (hereinafter, DSLAM) over an Ethernet cable. (A DSLAM allows voice grade service to be transported over an Ethernet connection to the DSL Modem which separates voice and data at the customer premises.) The A/B switch 17 and the first point of presence may be connected to a DSL modem 22 via RJ 45/48 interface connection.

The primary path A provides a first dial tone with a specific directory number to the A/B switch 17. The A/B switch's normal position will be in the "A" position to allow incoming and outgoing calls from the primary POP 14.

The secondary path B will be provided from a secondary POP 19. The secondary POP 19 may also be a 5ESS switch that is located at different location from the primary POP 14. The secondary POP 14 is known as a virtual tributary (VT) connection.

The second POP 19 is connected to the network management system 11 and to Port B of the A/B switch 17 over a modified service connection. The path of the modified service connection starts at the 5ESS switch 19 and is connected to a wide area network or WAN 20, 21 over a Primary Rate Interface ("PRI") T1 trunk. WAN 21 may include a channel bank Foreign Exchange Service ("FXS") line card that transmits signals over an encrypted T1 line provided by a commercial transport carrier. (In telecommunication, a foreign exchange service is a network-provided service, in which a telephone in a given local area is connected, via a private line, to a central office in another, i.e., "foreign", exchange, rather than the local exchange area's central office.)

The WAN 21 may terminate at a DSL modem 22 via RJ 45/48 interface connection to Port B of the A/B switch 17 on a physically diverse cable path "B." The secondary POP 19 provides a second dial tone to the A/B switch 17 on the physically diverse cable path. The second dial tone and the primary dial tone share the same directory number and the shared directory number is switched from one dial tone to the other via commands issued by the NMS to a tele-management system 18.

The path of the second POP 19 to the network management system 11 starts at the secondary POP 19 and is connected to the tele-management system ("TMS") 18 such as a COMIT ("Communication Management Information Tele-management system") server. The COMIT server 18 is then connected to a gateway router 13 associated with the NMS 11 which is connected to the 5ESS (14 and 19) switching network over a dedicated TTY ports.

The NMS 11 may send 5MML commands to the COMIT server (18) to update the routing translation tables in the switching network (14 and 19) to process all incoming calls internal/external of the network from the first point of presence 14 to the second point of presence 19 when the first point of presence 14 is not operational. For example, after the network management system 11 receives notice that the first point of presence 14 is not operational, the network management system 11 transmits the 5MML command to the COMIT server 18 over the dedicated TTY port to the 5ESS switching network 18. The COMIT server 18 then updates the routing translation tables for the specific directory number from the first point of presence 14 and inserts new translations in the routing tables for the specific directory number to the second point of presence 19 and vice versa.

The TMS 18 may be an approved tele-management system for 5ESS switch translations. For example, if the A/B switch 17 is signaled that the first point of service 14 lost service, the A/B switch 17 will switch from the first point of presence 14 to the second point of presence 19 and then notify the network management system 11 that the first point of service 14 lost service. A signal is then transmitted to the COMIT server to change the routing tables for a specific or group of directory number from Port A to Port B. This will allow outgoing/ incoming calls internal or external of the NMS 11 to be directed to the secondary transmission path B in the event the primary cable path A is down.

The fourth port, Port D, of the A/B switch 17 may be connected to an analog, digital or ISDN telephone set 23 that may receive telephony service from the A/B switch 17 regardless which point of presence is sending the service.

In use, a first control signal will auto-ping the DSLAM device 16 associated with the primary POP 14 via the edge router 12. A successful ping response signifies the primary cable path A is available and the A/B switch 17 will remain in the "A" position. If the ping response exceeds a specified delay time, the A/B switch 17 will automatically switch to the "B" position, and dial tone will be provided to the switch via the secondary POP 19.

Simultaneously, a simple management network protocol (hereinafter, "SNMP") trap from the IP AB switch is sent from port C Ethernet connection over the secondary path to the edge router 12 associated with the primary POP 14 and the NMS 11. The NetExpert VSM gateway server (NMS) will process the SNMP message and send the 5E MML commands over a dedicated TTY port on the COMIT server 18. The COMIT server 18 inserts the commands to the 5ESS switches within the network to remove the CAS directory number from the primary 5ESS switch 14 and insert the directory number into the secondary 5ESS switch 19, offsite.

At the same time, an alarm trap from the IP-based A/B switch 17 will be routed to a gateway router 13. The gateway router 13 at secondary POP 19 will transmit an alarm signal over the dedicated TTY port to the COMIT server 18. The COMIT server 18 then executes a pre-scripted batch release update command to change switch routing tables for a specified group of phone numbers, e.g., the 555-XXXX thousand groups. This will allow outgoing/incoming calls internal or external of the NMS 11 to be directed to the secondary transmission path B in the event the primary cable path A is down.

The system may also include a monitoring signal that monitors for an overload alarm. In this mode, a second control signal monitors the primary 5ESS switch for overload alarms. A virtual service manager 26 (herein after, "VSM") associated with the NMS 11, e.g., an Agilent NetExpert, monitors for the overload message. In the event, the primary 5ESS switch 14 stops call processing, a CPU overload alarm will be transmitted to VSM 26 via the edge router 12. This message will be an event trigger and the VSM 26 will transmit a SNMP trap to the A/B switch 17 signaling the switch to automatically switch to the "B" port.

The A/B switch 17 will then transmit a response SNMP trap to the NMS edge router 12 over the dedicated line signifying the switch to the "B" port. The edge router 12 then pings a dedicated TTY port to COMIT server 18 signifying the execution of a pre-defined APPTEXT which removes the CAS directory number from the primary 5ESS switch 14 and inserts the CAS directory number into the secondary, off-site 5ESS switch 19.

At the same time, the alarm trap from the A/B switch 17 will be routed to the NMS router 13 at the secondary CO. The NMS router 13 transmits a 5ESS MLL command over a dedicated TTY port to the COMIT server 18 for all CAS users to be removed and inserted into the secondary 5ESS switch. The COMIT server 18 then executes a pre-scripted 5E Batch Release update command to change the 5ESS switch routing tables throughout the switching network. This will allow internal and external calls within the switching network be processed by the secondary 5ESS switch in the event the primary 5ESS switch 14 stops call processing.

The system may also monitor a Signaling System 7 (hereinafter, "SS7") protocol that monitors for a signal transfer point (STP) reorder printer (ROP) for a "DPC Prohibited" alarm. In this mode, a third control signal monitors the SS7 link from a STP 27, e.g. a Telelec STP, to the primary 5ESS switch 14. (Tekelec's STP is a high-speed packet switch that allows carriers to deliver intelligent network features like credit card verification, caller ID, and 800 number look-up, using SS7 protocols.) In the event the CAS users primary 5ESS switch 14 shuts down, the STP 27 will transmit a "destination point code not allowed" message to the VSM 26. The VSM 26 will then trigger off the SNMP trap to execute the same commands identified with the overload alarm signals.

In summary, CAS 10 will provide dual dial tone simultaneously to the CAS user A/B switch 17 from two POPs, 14, and 19, using diverse transmission paths A, B. The CAS design 10 provides non-blocking switched voice services even when potential outage conditions exist for command and control communicators with mission critical applications during a cable outage or switch failure.

The benefit of the CAS design solution is that the design provides assured voice communications to critical users. Assured service or connectivity is defined as the ability of the NMS to optimize call completion rates for all critical users despite degradation because of network disruptions, natural disasters, or surges during crisis of war.

Figure 2:
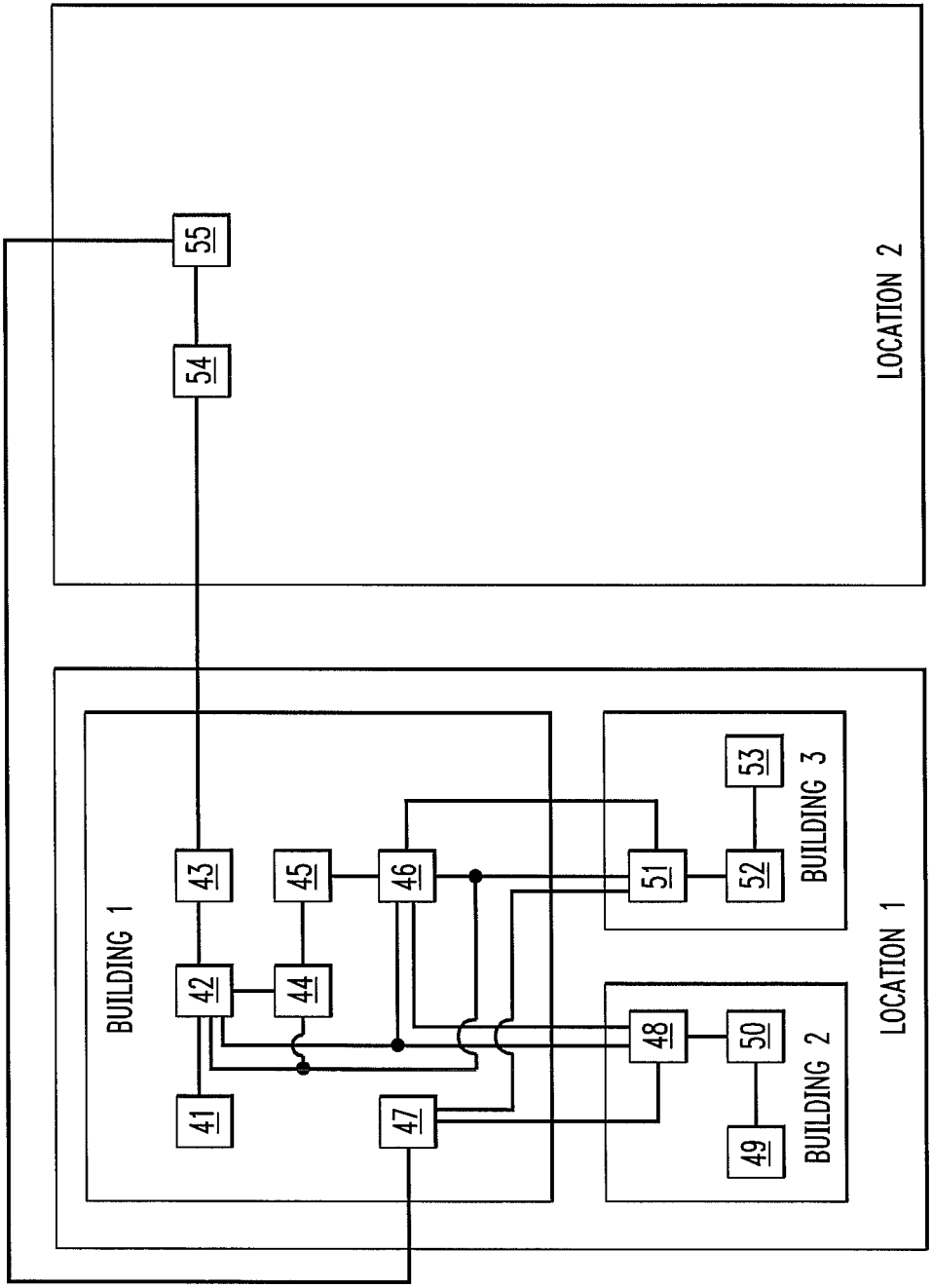
FIG. 2 is a block diagram showing a second embodiment of the present disclosed technology.

FIG. 2 shows an alternative design for the CAS system 40. In this embodiment, the system 40 is housed in two separate and distinct locations. Location 1 (L1) houses the primary POP 44, the NMS 41, A/B switches 48, 51, the COMIT server 43 as well as other components necessary for the transmission of the primary telephony service. (In this embodiment, the NMS 41 is housed at L1 but the NMS 41 may be housed at L2 or some other location that is remote from L1.) Location 2 (L2) houses the secondary POP 54 and other components necessary for the transmission of the secondary telephony service.

At L1, the primary telephony service will be provided by a primary 5ESS switch 44 located in Building 1. The primary 5ESS switch 44 is connected to an ISDN DSL (IDSL) universal splitter panel 45. The IDSL splitter panel 45 will blend ISDN voice data to a DSLAM 24-port ADSL/ADSL2+ universal splitter card 46 over POTS/ISDN transmission path. The ISDN service is transported from the splitter card 46 as an Ethernet connection over existing copper cable to an A/B switch 48, 51 at Building 2 and Building 3. For example, if the primary ISDN line is serving a military base, the 5ESS 44 will located in Building 1 and the ISDN service will be transmitted to Building 2 and 3 over existing intra-based copper cables.

The ISDN line is then cabled out from the A/B switches 48, 51 to IDSL modems 50, 52, respectively. The modems will terminate at CAS ISDN phone sets 49, 53, respectively. Under normal conditions, the CAS ISDN calls will be routed over the DSLAM 46 as IDSL to the primary 5ESS switch 44 located at Building 1. The primary 5ESS switch 44 is also connected to a COMIT server 43 via an edge router 42, discussed more fully below.

The secondary telephony service is provided from a secondary 5ESS switch 54 at Locations 2 which is a remote location from Location 1. The secondary 5ESS switch 54 is connected to WAN 55 over a PRI trunk. The PRI trunk terminates to an existing channel bank of the WAN port 47. The channel bank of WAN port 47 extends the secondary telephony service to the users' A/B switches 48, 51 over an existing physically diverse cable plant.

In the event of an outage of the CAS user's primary transmission path or the primary 5ESS switch 44 stops call processing, the A/B switches 48, 51 will switch from port "A" to port "B".

In use, the A/B switches 48, 51 will be configured for auto pinging of the DSLAM 46 at Building 1 over a dedicated Ethernet connection. If the ping response time fails, it is assumed the primary transmission path is out of service, and the A/B switches 48, 51 will change from the "A" to "B" position automatically allowing for outgoing and incoming calls to be placed from the secondary 5ESS switch 54.

Simultaneously, the A/B switches 48, 51 will route an SNMP trap to the NMS edge router 42 signifying the primary transport is down. The NMS edge router 42 will transmit the appropriate 5ESS APPTEXT command to the COMIT server 43 at L1 to remove the directory number from the primary switch 44 and to insert the directory number into the secondary switch 54. Simultaneously, the alarm trap from the IP-based A/B switches 48, 51 will be routed to the NMS router 42. The NMS router 42 at L1 transmits a 5E MML command over a dedicated TTY port to the COMIT server 43. The COMIT server 43 then executes a pre-scripted 5E Batch Release update command to change the 555-XXXX thousand groups to all 5ESS switch routing tables. This task will allow for incoming calls to be routed from the secondary 5ESS switch throughout the NMS.

The A/B switches 48, 51 are also capable of receiving SNMP traps from up to four SNMP managers and will switch from the "A" to "B" port upon acknowledgement. In the event that the 5ESS switch stops call processing at Location 1, the 5ESS switch may initiate, e.g., a CPU overload alarm. In this case, the NMS router will interface to the 5ESS and will execute the appropriate 5ESS APPTEXT command to the COMIT server 43. The COMIT server 43 will then remove the CAS directory number from the primary 5ESS switch 44 and insert the number into the secondary switch 54.

Additionally, the CPU overload SNMP trap will be sent to the user's A/B switches 48, 51. The A/B switches 48, 51 will switch the user from port "A" to "B" automatically and send a handshake signal back to the NMS 41 for acknowledgement.

Simultaneously, the alarm trap from the IP-based A/B switches 48, 51 will be routed to the NMS router 42. The NMS router 42 transmits an alarm signal over a dedicated TTY port to the COMIT server 43. The COMIT server 43 then executes a pre-scripted 5E Batch Release update command to change the thousand groups to all 5ESS switch routing tables. The NMS 41 will verify that no calls are in progress on the secondary path prior to restoring service to the primary path.

Figure 3:
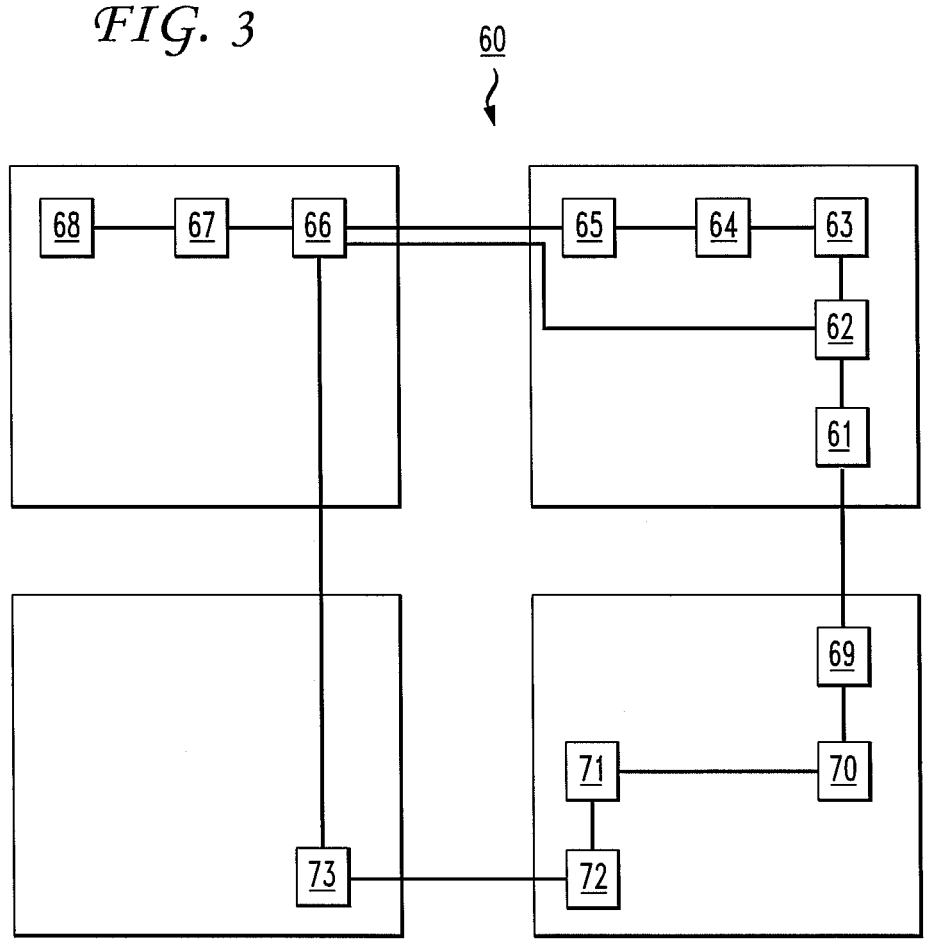
FIG. 3 is a block diagram showing a third embodiment of the present disclosed technology.

FIG. 3 shows another exemplary design of a CAS system. In this embodiment, the system 60 will be housed in four separate and distinct locations. Location 1 (L1) will house a primary POP 63 and a NMS 61, Location 2 (L2) will house a secondary POP 71 and a COMIT server 70, Location 3 (L3) will house a WAN 73 having an FXS line card and Location 4 (L4) will house a critical user's phone 168 and an A/B switch 66. Please note the NMS 61 may be housed at L1, L2 or some other location that is remote from L1 and L2.

The primary POP 63 is housed at L1 and may be a 5ESS switch. An analog line is cabled out from the 5ESS switch 63 to a DSL POTS splitter panel 64. The DSL POTS splitter panel 64 blends the voice and data signal of the telephony service to a DSLAM ADSL2+ port line card 65. The CAS service 60 will be extended as a 10/100 Ethernet transport from the DSLAM 65 to an A/B switch 66. The primary POP 63 is also connected to the NMS 61 via a T1 line attaching an edge router 62 to the NMS 61.

The secondary POP 71 is housed at L2 and may also be a 5ESS switch. A PRI trunk is provided from the 5ESS switch 71 and terminates to an existing channel bank in a WAN 72. The WAN 72 is then connected to L3 over a leased T1 line. The secondary 5ESS switch 71 is also connected to the COMIT server 70 and then to a gateway router 69 that is connected to the NMS 61 over a dedicated TTY port.

The WAN 73 is connected to L3 via a bulk encrypted T1 from a commercial transport carrier. The T1 lease will provide a WAN connection between L2 and L3. The WAN 73 at L3 is equipped with a FXS line card. The telephony service from the secondary POP 71 will be extended from L3's Channel Bank FXS card to Location 4—the user's A/B switch 66 "B" port—via a physically diverse cable path from the primary path end to end.

At L4, the A/B switch 66 is connected to a DSL modem 67. The modem 67 splits the voice and data circuit and terminates to the user's analog phone via POTS line. Incoming/outgoing calls will be processed in accordance with the switching network dialing plan under normal conditions.

In the event of an outage of the CAS users primary transmission path or primary 5ESS switch stops call processing, the A/B switch 66 will switch from port "A" to port "B" in the following method:

First, the A/B switch 66 at L4 is configured for auto-pinging the DSLAM 65 at L1 over the dedicated line. The A/B switch 66 is connected though the edge router 62 of the NMS 61 over the dedicated line. The auto-ping signal is transmitted over the dedicated line to the edge router 62 and the signal is transmitted to the DSLAM 65 of the primary POP 63 at regularly timed intervals. The ping response is due back within a certain time frame set by the A/B switch 66. If the ping response time fails, then it is assumed the primary transmission path is out of service and the IP-AP switch 66 will change from the "A" to "B" position automatically allowing for outgoing and incoming calls to be processed through the secondary POP 71.

In order to activate the secondary POP 17, at the same time the A/B switch 66 changes channels, an SNMP trap is routed to the NMS edge router 62 at L1 signifying the primary transport is down. The NMS edge router 62 will transmit an appropriate 5ESS switch command to the COMIT server 70 at L2 to remove a directory number from the primary switch and insert the user's directory number into secondary switch 71.

An alarm trap from the A/B switch 66 is also routed to the NMS router 69 at the secondary POP 71 at L2. The NMS router 69 at L2 transmits a5E MML command over a dedicated TTY port to the COMIT server 70. The COMIT server 70 then executes a pre-scripted batch release update command. This command changes the routing tables for a certain set of directory numbers, e.g., 555-XXXX group. That is, all incoming calls will be routed to the secondary 5ESS switch at L2 for call processing.

The A/B switch 66 is also capable of receiving SNMP traps from up to four SNMP managers that will switch the A/B switch 66 from the "A" to "B' port receipt of the message. For example, in the event that the primary 5ESS 63 switch stops call processing at L1, the primary 5ESS switch 63 may initiate a CPU overload alarm. The NMS router 62 will interface to the 5ESS switch 63 and will execute an appropriate 5ESS command to the COMIT server 70 at the secondary 5ESS switch. The COMIT server 70 will then remove the CAS directory number from the primary 5ESS switch at L1 and insert the number into the secondary switch at L2. Additionally, the CPU overload SNMP trap will be sent to the user's A/B switch 66 over the dedicated line. The A/B switch 66 acknowledgement will switch the user from port "A" to "B" automatically and send a handshake signal back to the NMS 61 for acknowledgement. Simultaneously, the alarm trap from the A/B switch 66 will be routed to the NMS router 62 at the secondary POP. The NMS router 62 at L2 transmits an alarm signal over a dedicated TTY port to the COMIT server 70. The COMIT server 70 then executes a pre-scripted release update command to change switching tables for the thousand groups.

Figure 4:
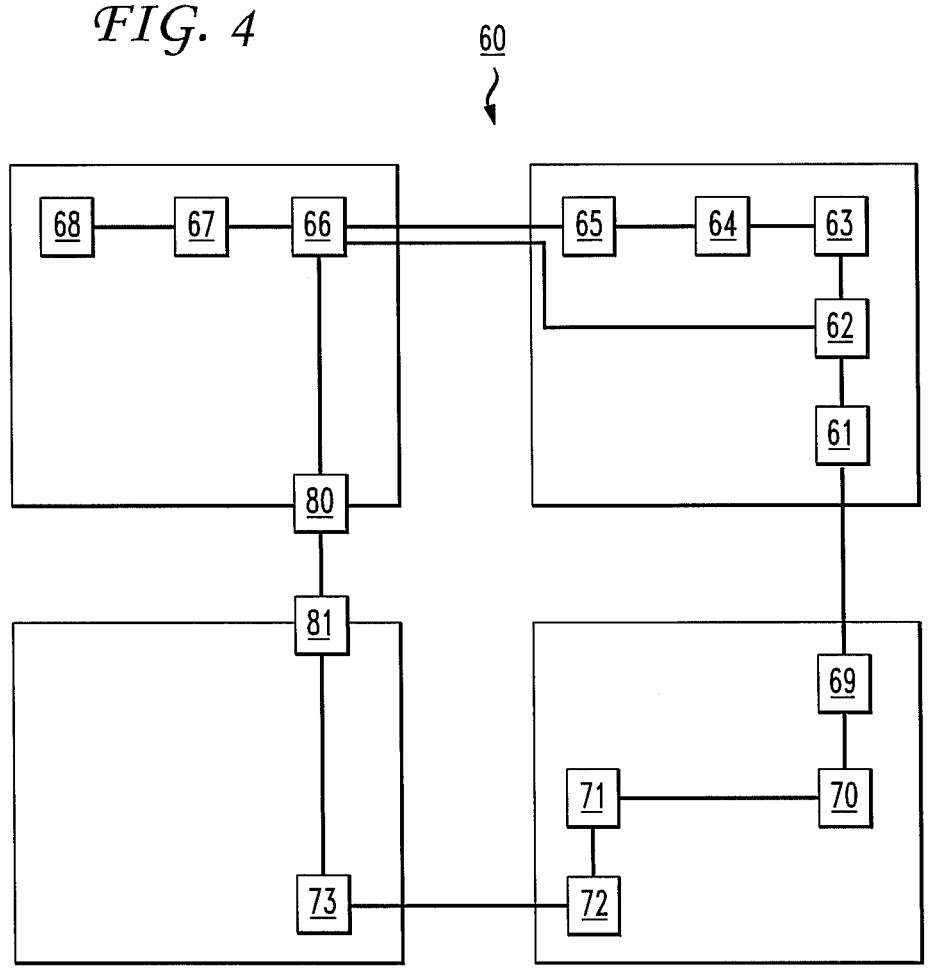
FIG. 4 is a block diagram showing a fourth embodiment of the present disclosed technology.

FIG. 4 shows an exemplary design of a CAS system that is similar to FIG. 3 except the WAN at Location 3 is connected to A/B switch over Free Space Optic (FSO) 80, 81. In the event that the CAS submits orders to remote locations where diverse cable plant is non-existent, FSO may be a suitable option for deployment which will allow connectivity while maintaining security and safety.

The foregoing Detailed Description is to be understood as being in every respect illustrative and exemplary, but not restrictive, and the scope of the disclosed technology disclosed herein is not to be determined from the Detailed Description, but rather from the claims as interpreted according to the full breadth permitted by the patent laws. It is to be understood that the embodiments shown and described herein are only illustrative of the principles of the present disclosed technology and that various modifications may be implemented by those skilled in the art without departing from the scope and spirit of the disclosed technology. Those skilled in the art could implement various other feature combinations without departing from the scope and spirit of the disclosed technology.

The invention claimed is:

1. An apparatus comprising:
a network management system;
a switch having at least four ports, wherein a first port is connected to a primary path to a first point of presence, the primary path including a connection between the first point of presence and a first router associated with the network management system, wherein a second port is connected to a secondary path to a second point of presence, the secondary path including a connection between the second point of presence and a server, the server connected to a second router associated with the network management system, wherein a third port is connected to the network management system via a dedicated line;
the switch for sending and receiving signals to and from the network management system over the dedicated line, the switch for:
automatically switching telephone service from the primary path to the first point of presence to the secondary path to the second point of presence after being signaled that the first point of presence is inoperable; and
the network management system for sending a command to the server when the first point of presence is inoperable, the command instructing the server to update routing translation tables of a specified group of phone numbers in a switching network to identify the second point of presence instead of the first point of presence so as to direct all internal and external incoming calls to the second point of presence along the secondary path.

2. The apparatus as claimed in claim 1 wherein the signals include an auto-ping signal for determining if the first point of presence is inoperable.

3. The apparatus as claimed in claim 2 wherein the auto-ping signal continuously monitors the first point of presence and the switch changes to the secondary path based on an absence of a timed response from the first point of presence.

4. The apparatus as claimed in claim 1 wherein the signals include an overload alarm signal for determining if the primary point of presence is experiencing overload.

5. The apparatus as claimed in claim 1 wherein the signals include a signal transfer point signal indicating whether a signal transfer point has a disturbance.

6. The apparatus as claimed in claim 3 wherein the switch automatically switches the telephone service from the second point of presence to the first point of presence after the switch is signaled that service to the first point of presence is restored.

7. The apparatus as claimed in claim 2 wherein the first point of presence is for providing a first dial tone to the switch, the first dial tone having a specific directory number.

8. The apparatus as claimed in claim 7 wherein the second point of presence is for providing a second dial tone to the switch, the second dial tone sharing the specific directory number with the first dial tone.

9. The apparatus as claimed in claim 8 wherein the second point of presence transmits to the switch over a wide area network having a foreign exchange service line card.

10. The apparatus as claimed in claim 8
wherein a tele-management system switches a specific directory number from the first point of presence to the second point of presence when the first point of presence is inoperable.

11. The apparatus as claimed in claim 10 wherein the tele-management system includes a dedicated port for sending and receiving messages from the network management system.

12. The apparatus as claimed in claim 11 wherein the network management system notifies the tele-management system that the first point of presence is inoperable.

13. A method comprising:
a switch automatically switching communication access from a primary path to a first point of presence to a secondary path to a second point of presence when the first point of presence is inoperable,
the primary path connecting a first port of the switch to the first point of presence and connecting a first router associated with a network management system to the first point of presence,
the secondary path connecting a second port of the switch to the second point of presence and connecting a server to the second point of presence, the server connected to a second router associated with the network management system;
the switch receiving a signal that the first point of presence is inoperable; and
sending a command from the network management system to the server when the first point of presence is inoperable, the command instructing the server to update routing translation tables of a specified group of phone numbers in a switching network to identify the second point of presence instead of the first point of presence to direct all internal and external calls to the second point of presence along the secondary path.

14. The method as claimed in claim 13 wherein the switch sends and receives signals comprising an auto-ping signal for determining if the first point of presence is operating.

15. The method as claimed in claim 14 wherein the auto-ping signal continuously monitors the first point of presence; and
wherein switching communication access from the primary path to the secondary path comprises changing to use of the secondary path based on an absence of a timed response from the first point of presence.

16. The method as claimed in claim 15 further comprising: sending by the switch a notification to the network management system that the first point of presence has lost service.

17. The method as claimed in claim 15, wherein the switch automatically switches telephone service from the second point of presence back to the first point of presence upon receiving a signal that the first point of presence is operational.

18. The method as claimed in claim 14 wherein the first point of presence provides a first dial tone to the switch, the first dial tone having a specific directory number.

19. The method as claimed in claim 18 wherein the second point of presence provides a second dial tone to the switch, the second dial tone sharing a directory number with the first dial tone.

20. The method as claimed in claim 16 further comprising:
at a tele-management system, switching a specific directory number from the first point of presence to the second point of presence when the first point of presence is inoperable.

21. The method as claimed in claim 20 further comprising:
notifying the tele-management system by the network management system that the first point of presence is inoperable.

* * * * *